(12) United States Patent
Dalin

(10) Patent No.: US 8,085,210 B2
(45) Date of Patent: Dec. 27, 2011

(54) METHOD FOR OBTAINING A PREDETERMINED POSITION OF AN ANTENNA

(75) Inventor: Erik Dalin, Stockholm (SE)

(73) Assignee: C2SAT communications AB, Solna (SE)

( * ) Notice: Subject to any disclaimer, the term of this patent is extended or adjusted under 35 U.S.C. 154(b) by 400 days.

(21) Appl. No.: 12/521,908

(22) PCT Filed: Dec. 14, 2007

(86) PCT No.: PCT/SE2007/051007
§ 371 (c)(1),
(2), (4) Date: Jul. 1, 2009

(87) PCT Pub. No.: WO2008/085101
PCT Pub. Date: Jul. 17, 2008

(65) Prior Publication Data
US 2010/0019986 A1 Jan. 28, 2010

(30) Foreign Application Priority Data
Jan. 9, 2007 (SE) ...................................... 0700030

(51) Int. Cl.
*H01Q 3/00* (2006.01)
(52) U.S. Cl. ......... 343/757; 343/765; 342/359; 342/375
(58) Field of Classification Search ................... 343/757, 343/765, 766, 882
See application file for complete search history.

(56) References Cited

U.S. PATENT DOCUMENTS

| | | | |
|---|---|---|---|
| 5,227,806 A * | 7/1993 | Eguchi ........................ 343/765 |
| 5,283,508 A | 2/1994 | Komatsu |
| 5,347,286 A * | 9/1994 | Babitch ......................... 342/359 |
| 6,002,364 A * | 12/1999 | Kroeger et al. ............... 342/359 |
| 6,034,643 A | 3/2000 | Nishikawa et al. |
| 6,075,482 A * | 6/2000 | Fukushima .................... 342/359 |
| 6,124,832 A * | 9/2000 | Jeon et al. ..................... 343/711 |
| 6,191,734 B1 * | 2/2001 | Park et al. ..................... 342/359 |
| 6,653,981 B2 * | 11/2003 | Wang et al. ................... 343/713 |
| 2004/0135532 A1 | 7/2004 | Tomatsuri et al. |
| 2007/0085506 A1 | 4/2007 | Oks |

OTHER PUBLICATIONS

Ostergren Elmotor AB, "Snabbkurs om elektriska motorer och drivsystem", retrieved from http://www.ostergrens.se/sv/Produkter/Service-och-tjanster/, pp. 227-302.
Sanyo Denki America, Inc, "A Handbook of AC Servo Systems", retrieved from http://www.motiononline.com/NewFiles/download.html.
International Search Report dated Jun. 2, 2008, from corresponding PCT application.

* cited by examiner

*Primary Examiner* — Tho G Phan
(74) *Attorney, Agent, or Firm* — Young & Thompson

(57) ABSTRACT

Method for obtaining a predetermined position for a satellite antenna, whereby a controller (9) is made to transfer information to a velocity controller (3), in turn being made to transfer information to a current regulator (4), being made to transfer current to a motor which is intended for setting the desired position of the satellite antenna. The electrical motor (5) is made to receive current from the current regulator so that the electrical motor is made to turn a predetermined angle during a predetermined time interval. An angle sensor (6) is positioned on the satellite antenna and is made to read an absolute angle or an angular displacement of the satellite antenna, and the angle sensor is connected to the controller so as to create a feedback loop. An automatic control system is also disclosed.

7 Claims, 1 Drawing Sheet

METHOD FOR OBTAINING A PREDETERMINED POSITION OF AN ANTENNA

The present invention relates to a method for obtaining a predetermined position for satellite antennas.

Figure 1:
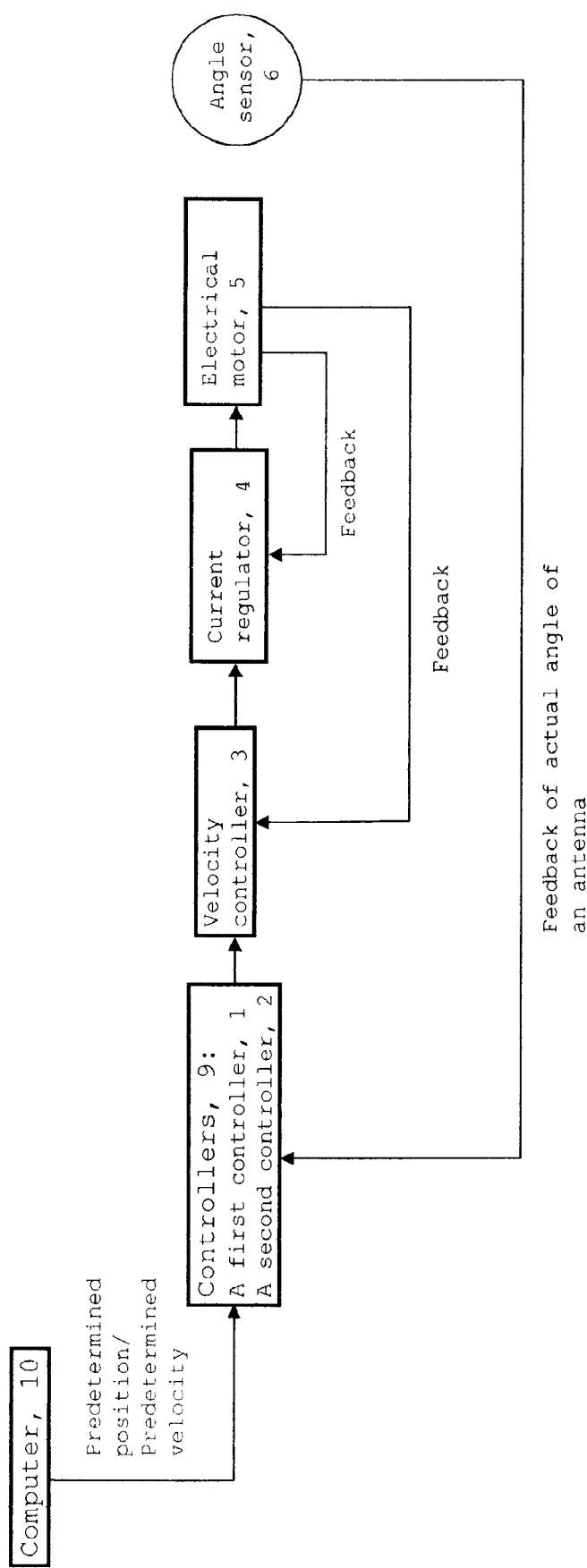

In order to obtain a predetermined position for a satellite antenna, usually a control engineering type solution is used. A suitable, known way is to transfer information indicating a predetermined position which the satellite antenna should assume, as well as a velocity with which the satellite antenna should be displaced. In these cases, the information is transferred to a position controller and to a velocity controller. Depending on the velocity with which the satellite antenna should be displaced to a new position, a set amperage, as well as a time interval for the current to be sent, is transferred from a current regulator to a motor, a stepping motor.

For example, a predetermined angle and the velocity with which the desired angle should be assumed is transferred by the control engineering type solution to the stepping motor. Normally, the motor does not have a feedback loop, in other words it lacks the transfer of information from the motor back to the regulator, to the position controller and the velocity controller, respectively, after which an adjustment of the amperage and the time interval with which the current is sent to the current regulator takes place, followed by the setting of a new amperage and a new time interval with which the current is sent to the stepping motor. Finally, the desired angle of the stepping motor is obtained.

So far, stepping motors have been used to obtain high precision with respect to position and velocity at given times.

A problem with the above described control engineering type solution is that there may be an error during operation and mechanical play between the motor and the antenna, which is why the antenna in practice may be positioned in another angle than the one being fed back from the motor to the position controller as the set angle. In these cases, the motor will finally assume the predetermined, set angle, but because of the error between the motor and the antenna the actual positioning of the antenna will be wrong.

The present invention solves the above mentioned problems.

Thus, the present invention relates to a method for obtaining a predetermined position for a satellite antenna, whereby a controller is caused to transfer information to a velocity controller, which in turn is being caused to transfer information to a current regulator, being caused to transfer current to a motor which is intended for setting the desired position of the satellite antenna, and is characterized in that an electrical motor is caused to receive current from the current regulator so that the electrical motor is caused to turn a predetermined angle during a predetermined time interval, in that an angle sensor is positioned on the satellite antenna and is caused to read an absolute angle or an angular displacement of the satellite antenna, and in that the angle sensor is connected to the controller so as to create a feedback loop.

Furthermore, the invention relates to an automatic control system of the type and with the main characteristics as indicated in claim 6.

Below, the invention is described in closer detail, partly in connection to embodiments illustrated in the appended drawing, where FIG. 1 shows a block diagram of a method and an automatic control system for obtaining a predetermined position for satellite antennas.

The present invention relates to an automatic control system for obtaining a predetermined position for satellite antennas. The system comprises a controller 9, connected to a velocity controller 3, which in turn is being connected to a current regulator 4. The current regulator 4 is connected to a motor, intended to set the desired position of the satellite antenna. In this case, the controller 9 is a feed-forward controller.

According to a preferred embodiment, FIG. 1 shows an electrical motor 5. The motor 5 is arranged to receive current from the current regulator 4, so that the motor 5 is turned a predetermined angle during a predetermined time interval. An angle sensor 6 is arranged on the satellite antenna in order to read an absolute angle or an angular displacement of the satellite antenna. The angle sensor 6 is connected to the controller 9 for feedback.

According to a preferred embodiment, the electrical motor 5 is an AC servo-motor.

According to a preferred embodiment, the controller 9 comprises a first controller 1. The first controller 1 is caused to receive information indicating a predetermined position for the satellite antenna, and a predetermined velocity with which the satellite antenna should be displaced, from a computer 10.

According to another preferred embodiment, the angle sensor 6 is caused to transfer information indicating the angular displacement of the satellite antenna to a second controller 2. The second controller 2 is caused to transfer information indicating the position of the satellite antenna to the motor 5 in order to fine-tune the angle of the satellite antenna. In this case, the second controller 2 takes care of minor errors, whereby self-oscillations or oscillations may be avoided. Vibrations are reduced and thereby also wear.

According to another preferred embodiment, the velocity with which the angle is altered is a frequency with which pulses are transferred to the motor 5.

According to yet another preferred embodiment, the position is given by a number of pulses being transferred to the motor 5.

Above, a number of embodiments and uses have been described. However, the invention may be varied. The first 1 and the second 2 controller, as well as the velocity controller 3 and the current regulator 4, the motor 5 and the angle sensor 6 may be designed in other suitable ways without departing from the basic idea of the invention.

Thus, the present invention is not limited to the above described embodiments, but may be varied within the scope of the appended claims.

The invention claimed is:

1. Method for obtaining a predetermined position for a satellite antenna, whereby an angle sensor (6), which is positioned on the satellite antenna and caused to read an absolute angle or an angular displacement of the satellite antenna, is caused to be connected to a feed-forward controlled controller (9) so as to create a feedback loop, characterized in that the controller (9) is caused to transfer information to a velocity controller (3), in turn being caused to transfer information to a current regulator (4), being caused to transfer current to an AC servo-motor which is intended for setting the desired position of the satellite antenna, in that the electrical motor (5) is caused to receive current from the current regulator (4) so that the electrical motor (5) is caused to turn a predetermined angle during a predetermined time interval, in that the controller (9) is caused to comprise a first controller (1) as well as a second controller (2), in that the first controller (1) is caused to receive information indicating a predetermined position of the antenna and a predetermined velocity with which the antenna should be displaced, in that the angle sensor (6) is caused to transfer information indicating the angle or the angular displacement of the antenna to the second controller (2), and in that the second controller (2) is caused to transfer information indicating the position of the antenna to the electrical motor (5) in order to fine-tune the angle of the antenna.

2. Method according to claim 1, characterized in that the velocity with which the angle is to be changed is a frequency with which pulses are transferred to the electrical motor (5).

3. Method according to claim 2, characterized in that the position is made to be given by a number of pulses being transferred to the electrical motor (5).

4. Method according to claim 1, characterized in that the position is made to be given by a number of pulses being transferred to the electrical motor (5).

5. Automatic control system for obtaining a predetermined position of a satellite antenna, whereby an angle sensor (6), which is positioned on the satellite antenna and arranged to read an absolute angle or an angular displacement of the satellite antenna, is connected to a feed-forward controlled controller (9) so as to create a feedback loop, characterized in that the controller (9) is connected to a velocity controller (3), in turn being connected to a current regulator (4), being connected to an AC servo-motor which is intended for setting the desired position of the satellite antenna, in that the electrical motor (5) is arranged to receive current from the current regulator (4) so that the motor (5) is turned a predetermined angle during a predetermined time interval, in that the controller (9) comprises a first controller (1) as well as a second controller (2), in that the first controller (1) is arranged to receive information indicating a predetermined position of the antenna and a predetermined velocity with which the antenna is arranged to be displaced, in that the angle sensor (6) is arranged to transfer information indicating the angle or the angular displacement of the antenna to the second controller (2), and in that the second controller (2) is arranged to transfer the information indicating the position of the antenna to the electrical motor (5) in order to fine-tune the angle of the antenna.

6. Automatic control system according to claim 5, characterized in that the velocity with which the angle is changed is a frequency with which pulses are transferred to the motor (5).

7. Automatic control system according to claim 6, characterized in that the position is arranged to be given by a number of pulses being transferred to the motor (5).

* * * * *